United States Patent
Hotta et al.

(10) Patent No.: US 10,007,253 B2
(45) Date of Patent: Jun. 26, 2018

(54) THREE-DIMENSIONAL PRINTING APPARATUS, METHOD FOR THREE-DIMENSIONAL PRINTING, AND COMPUTER-READABLE STORAGE MEDIUM

(71) Applicant: Roland DG Corporation, Hamamatsu-shi, Shizuoka (JP)

(72) Inventors: Tomoyuki Hotta, Hamamatsu (JP); Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 481 days.

(21) Appl. No.: 14/528,015

(22) Filed: Oct. 30, 2014

(65) Prior Publication Data
US 2015/0120033 A1 Apr. 30, 2015

(30) Foreign Application Priority Data
Oct. 30, 2013 (JP) .................................. 2013-225718

(51) Int. Cl.
G05B 19/4099 (2006.01)
B29C 64/112 (2017.01)

(52) U.S. Cl.
CPC ........ *G05B 19/4099* (2013.01); *B29C 64/112* (2017.08); *G05B 2219/49023* (2013.01)

(58) Field of Classification Search
None
See application file for complete search history.

(56) References Cited

U.S. PATENT DOCUMENTS

2011/0301441 A1* 12/2011 Bandic ................. A61B 5/0059
600/306

FOREIGN PATENT DOCUMENTS

JP  06-98689 B2  12/1994

OTHER PUBLICATIONS

Luo et al., "Desktop Rapid Prototyping System With Supervisory Control and Monitoring Through Internet", Dec. 2001, IEEE/ASME Transactions on Mechatronics, vol. 6, No. 4, p. 399-409.*

* cited by examiner

Primary Examiner — Mohammad Ali
Assistant Examiner — Saad M Kabir
(74) Attorney, Agent, or Firm — Keating & Bennett, LLP

(57) ABSTRACT

When first cross-sectional image data representing a target model corresponding to a shape of a three-dimensional printing object, and second cross-sectional image data representing both of the target model and a support model corresponding to a shape of a member assisting the creation of the three-dimensional printing object, are recognized to match each other by at least a predetermined ratio, the second cross-sectional image data is stored in a storage as third cross-sectional image data. In contrast, when the first cross-sectional image data and the second cross-sectional image data are recognized not to match each other by at least the predetermined ratio, synthesis data of the first cross-sectional image data and the second cross-sectional image data is stored in the storage medium as the third cross-sectional image data. The three-dimensional printing object is created based on the third cross-sectional image data.

11 Claims, 7 Drawing Sheets

THREE-DIMENSIONAL PRINTING APPARATUS, METHOD FOR THREE-DIMENSIONAL PRINTING, AND COMPUTER-READABLE STORAGE MEDIUM

The present application claims priority from Japanese Patent Application No. 2013-225718 filed on Oct. 30, 2013, which is incorporated by reference herein in its entirety.

BACKGROUND OF THE INVENTION

1. Field of the Invention

The present invention relates to a three-dimensional printing apparatus, a method for three-dimensional printing, and a computer-readable storage medium; and in more detail, to a three-dimensional printing apparatus and a method for three-dimensional printing that create a three-dimensional printing object by use of a photo-curable resin that is cured when being irradiated with light, and a computer-readable storage medium.

2. Description of the Related Art

Conventionally, as described in, for example, Japanese Patent Publication for Opposition No. Hei 6-98689, a three-dimensional printing object is created by a method of ejecting a photo-curable resin from a head based on three-dimensional data that represents a shape of the three-dimensional printing object and curing the photo-curable resin. In more detail, based on one piece of cross-sectional image data that is a part of the three-dimensional data, a liquid glue-like photo-curable resin is ejected from an ejection nozzle located to be movable in three axis directions, namely, an X axis direction, a Y axis direction and a Z axis direction that are perpendicular to one another. The ejected photo-curable resin is irradiated with light to be cured, and thus a cured layer is formed. A plurality of such cured layers formed based on the cross-sectional image data are stacked to create a three-dimensional printing object.

The above-described cross-sectional image data is image data corresponding to a cross-sectional shape obtained when the three-dimensional printing object corresponding to the three-dimensional data is dissected along an X-Y plane at a predetermined interval in the Z axis direction. Namely, the above-described cross-sectional image data corresponds to one cross-sectional shape obtained by dividing the three-dimensional printing object into a plurality of layers in a horizontal direction. In this manner, a plurality of pieces of cross-sectional image data are created from one piece of three-dimensional data. Specifically, as shown in FIG. 6, three dimensional data of a full model FM including a support model SM is created. The support model SM corresponds to a support member that assists accurate creation of a three-dimensional printing object corresponding to the shape of a target model TM by a computing process. From this three-dimensional data, a plurality of pieces of cross-sectional image data are created. Namely, a plurality of pieces of cross-sectional image data respectively corresponding to cross-sectional shapes obtained by dissecting the full model FM including the support model SM along the X-Y plane at a predetermined interval in the Z axis direction are created.

However, when the shape of the target model TM, which is a final printing object, is complicated, the shape of the full model FM corresponding to the target model TM is also complicated accordingly. Three-dimensional data corresponding to the support model SM is added to the target model TM by a computing process to create the three-dimensional data of the full model FM. In this case, a computing process load is increased as the shape of the full model FM is getting more complicated. An error caused to the computing process result on the three-dimensional data corresponding to the full model FM is increased by an error, a mistake or the like in the computing process. In the worst case, a flaw occurs such that a cross-section represented by the cross-sectional image data corresponding to the full model FM including the support model SM has a missing portion or a portion has disappeared. So far no countermeasure for checking or repairing such cross-sectional image data has been found, and an operator finds that the printing has ended up failing by checking the three-dimensional printing object. That is, the operator recognizes that the cross-sectional image data of the full model FM has a missing portion when viewing the final printing object after the printing work is finished.

In the meantime, there is a method for creating the cross-sectional image data, by which the computing process is executed strictly so that the cross-section of the full model FM is prevented from having a missing portion. However, such a strict computing process is significantly complicated, and creation of the cross-sectional image data requires a long time. Because of these reasons, development of an apparatus that is capable of easily creating cross-sectional image data without requiring a long time with no such flaw that the cross-section of the full model FM has a missing portion is desired but has not yet been possible.

SUMMARY OF THE INVENTION

Preferred embodiments of the present invention provides a three-dimensional printing apparatus and a method for three-dimensional printing that are capable of easily creating cross-sectional image data without requiring a long time with no such flaw that a cross-section of a full model has a missing portion, and a computer-readable storage medium.

A three-dimensional printing apparatus according to a preferred embodiment of the present invention creates a three-dimensional printing object based on three-dimensional data representing a shape of the three-dimensional printing object. The three-dimensional printing apparatus includes a first cross-sectional image data generator that creates first cross-sectional image data representing a target model corresponding to the shape of the three-dimensional printing object, from a plurality of cross-sectional shapes that are continuous in a predetermined direction, by use of the three-dimensional data; a second cross-sectional image data generator that creates second cross-sectional image data representing both of the target model and a support model corresponding to a shape of a member assisting the creation of the three-dimensional printing object, from a plurality of cross-sectional shapes that are continuous in the predetermined direction, by use of the three-dimensional data; a comparator that compares the first cross-sectional image data and the second cross-sectional image data to each other to determine whether or not the first cross-sectional image data and the second cross-sectional image data are recognized to match each other by at least a predetermined ratio; a synthesizer that synthesizes the first cross-sectional image data and the second cross-sectional image data to create synthesis data; and a storage that stores the second cross-sectional image data or the synthesis data as third cross-sectional image data. When the comparator determines that the first cross-sectional image data and the second cross-sectional image data are recognized to match each other by at least the predetermined ratio, the second cross-sectional image data is stored in the storage as the third cross-sectional image data; when the comparator determines that the first cross-sectional image data and the second cross-sectional image data are recognized not to match each other by at least the predetermined ratio, the synthesis data is stored in the storage as the third cross-sectional image data; and the three-dimensional printing object is created based on the third cross-sectional image data.

A three-dimensional printing apparatus according to a preferred embodiment of the present invention further includes a binary image data generator that binarizes the first cross-sectional image data and the second cross-sectional image data to create first binary cross-sectional image data and second binary cross-sectional image data; and an index data generator that indexes the first binary cross-sectional image data and the second binary cross-sectional image data to create first index data and second index data, each of which includes an array elements each having a value of "0" or "1". The comparator compares the first index data and the second index data against each other to determine whether or not the first index data and the second index data are recognized to match each other by at least a predetermined ratio; when the comparator determines that the first index data and the second index data are recognized to match each other by at least the predetermined ratio, the second cross-sectional image data is stored in the storage as the third cross-sectional image data; and when the comparator determines that the first index data and the second index data are recognized not to match each other by at least the predetermined ratio, the synthesis data is stored in the storage as the third cross-sectional image data.

In various preferred embodiments of the present invention, the comparator compares array element value "1" of the first index data and array element value "1" of the second index data to determine whether or not the first index data and the second index data are recognized to match each other by at least the predetermined ratio.

A method for three-dimensional printing according to another preferred embodiment of the present invention creates a three-dimensional printing object based on three-dimensional data representing a shape of the three-dimensional printing object. The method includes a first step of creating first cross-sectional image data representing a target model corresponding to the shape of the three-dimensional printing object, from a plurality of cross-sectional shapes that are continuous in a predetermined direction, by use of the three-dimensional data; a second step of creating second cross-sectional image data representing both of the target model and a support model corresponding to a shape of members assisting the creation of the three-dimensional printing object, from a plurality of cross-sectional shapes that are continuous in the predetermined direction, by use of the three-dimensional data; a third step of comparing the first cross-sectional image data and the second cross-sectional image data against each other to determine whether or not the first cross-sectional image data and the second cross-sectional image data are recognized to match each other by at least a predetermined ratio; a fourth step of storing the second cross-sectional image data in a storage as third cross-sectional image data when it is determined in the third step that the first cross-sectional image data and the second cross-sectional image data are recognized to match each other by at least the predetermined ratio, whereas storing synthesis data obtained by synthesizing the first cross-sectional image data and the second cross-sectional image data in the storage as the third cross-sectional image data when it is determined in the third step that the first cross-sectional image data and the second cross-sectional image data are recognized not to match each other by at least the predetermined ratio; and a fifth step of creating the three-dimensional printing object based on the third cross-sectional image data.

A method for three-dimensional printing according to a preferred embodiment of the present invention further includes a sixth step of binarizing the first cross-sectional image data and the second cross-sectional image data to create first binary cross-sectional image data and second binary cross-sectional image data; and a seventh step of indexing the first binary cross-sectional image data and the second binary cross-sectional image data to create first index data and second index data each of which includes array elements each having a value of "0" or "1". The third step includes the step of comparing the first index data and the second index data against each other to determine whether or not the first index data and the second index data are recognized to match each other by at least a predetermined ratio; and the fourth step includes the step of storing the second cross-sectional image data in the storage as the third cross-sectional image data when it is determined that the first index data and the second index data are recognized to match each other by at least the predetermined ratio, whereas storing the synthesis data in the storage as the third cross-sectional image data when it is determined that the first index data and the second index data are recognized not to match each other by at least the predetermined ratio.

In a preferred embodiment of the present invention, the third step includes the step of comparing array element value "1" of the first index data and array element value "1" of the second index data to determine whether or not the first index data and the second index data are recognized to match each other by at least the predetermined ratio.

On a computer-readable storage medium according to a preferred embodiment of the present invention, a program that causes a computer to act as a three-dimensional printing apparatus described above is stored.

On a computer-readable storage medium according to a preferred embodiment of the present invention, a program that causes a computer to execute a method for three-dimensional printing described above is stored.

As the storage medium, a semiconductor memory such as a ROM or the like, a hard disc, a CD (compact disc), a DVD (digital versatile disc) or the like, for example, is usable.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
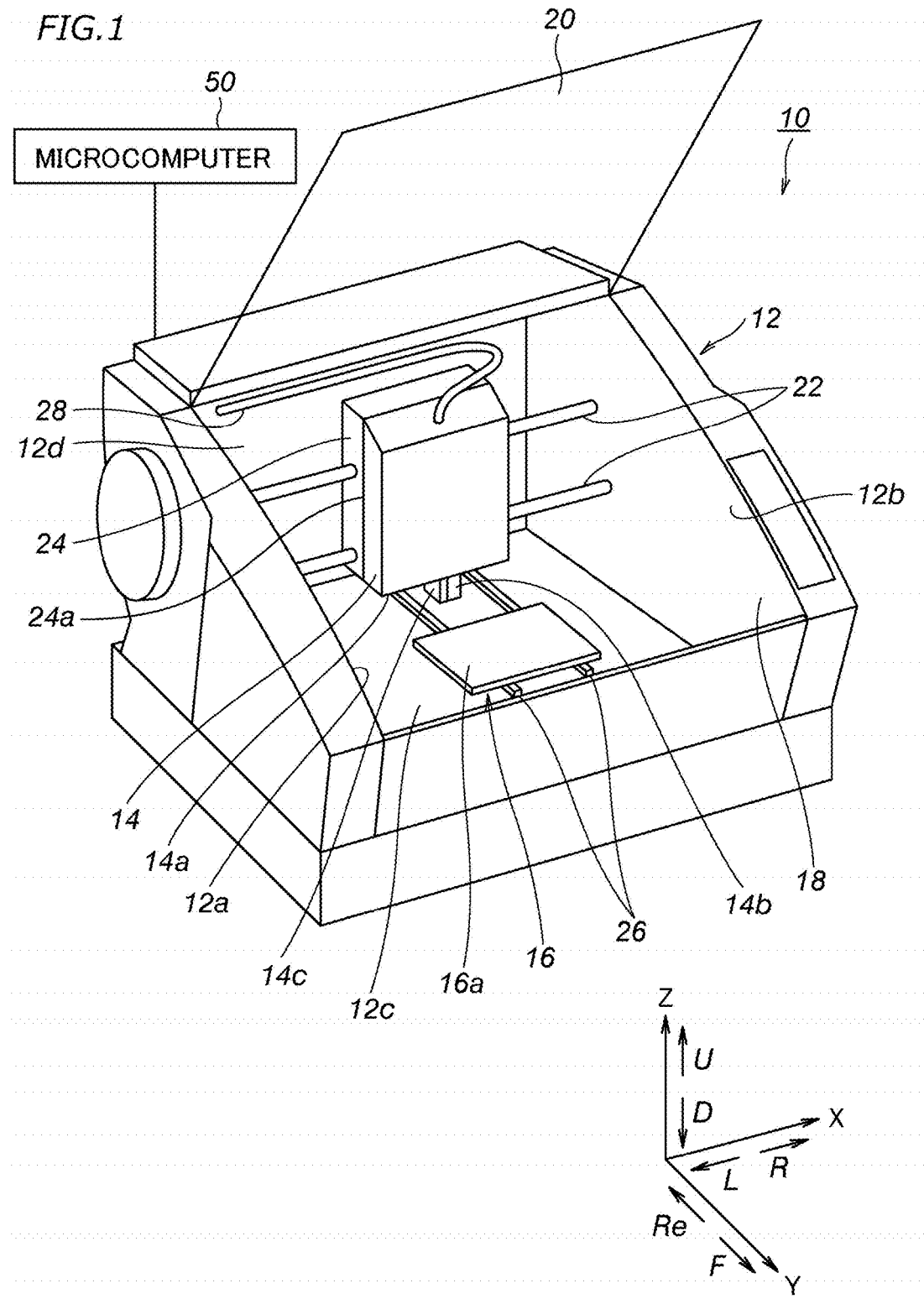
FIG. 1 is a perspective view showing a structure of a three-dimensional printing apparatus according to a preferred embodiment of the present invention.

Hereinafter, preferred embodiments of the present invention will be described with reference to the drawings. As shown in FIG. 1, an X axis, a Y axis and a Z axis are perpendicular to one another, and a three-dimensional printing apparatus is located on a plane formed by the X axis and the Y axis. In the figure, L refers to the left side of the X axis and R refers to the right side of the X axis. F refers to the front side of the Y axis and Re refers to the rear side of the Y axis. U refers to the up side of the Z axis and D refers to the down side of the Z axis. These directions are defined merely for the sake of explanation, and do not limit in any way the form of installing the three-dimensional printing apparatus according to various preferred embodiments of the present invention.

As shown in FIG. 1, a three-dimensional printing apparatus 10 in this preferred embodiment includes a housing 12. The housing 12 includes a side member 12a, a side member 12b, a bottom member 12c and a rear member 12d. The side member 12a is erected at a left end of the bottom member 12c. The side member 12b is erected at a right end of the bottom member 12c. The rear member 12d is erected at a rear end of the bottom member 12c and is in contact with the side member 12a and the side member 12b. Inside the housing 12, an ejection head 14 and a table 16 are provided. The ejection head 14 ejects a photo-curable resin and cures the photo-curable resin. On a top surface 16a of the table 16, a three-dimensional printing object is created of the photo-curable resin ejected from the ejection head 14.

Overall operations of the three-dimensional printing apparatus 10 in this preferred embodiment are controlled by a microcomputer 50. The microcomputer 50 is configured or programmed to create cross-sectional image data required to create a three-dimensional printing object, based on three-dimensional data (data of a three-dimensional model) corresponding to a shape of the three-dimensional printing object, which is to be created. The microcomputer 50 is configured or programmed to control an operation of each of the elements thereof based on the cross-sectional image data, and also forms and stacks cured layers to create a desired three-dimensional printing object. The cross-sectional image data will be described later in detail.

Referring to FIG. 1 again, the housing 12 is provided with an opening 18 in a top and front portion thereof. Namely, a space enclosed by the side member 12a, the side member 12b, the bottom member 12c and the rear member 12d described above is the opening 18. The opening 18 is covered with a cover member 20 that is, for example, transparent and openable/closable. When the cover member 20 is opened, the opening 18 of the housing 12 is communicated with a space outer to the housing 12 and put into an open state. By contrast, when the cover member 20 is closed, the opening 18 of the housing 12 is shielded from the space outer to the housing 12 and put into a closed state. In the open state of the cover member 20, a three-dimensional printing object created on the top surface 16a of the table 16 is able to be removed. By contrast, in the closed state of the cover member 20, the ejection head 14 is able to eject a photo-curable resin and other operations are able to be performed to create a three-dimensional printing object.

Inside the housing 12, a pair of guide rails 22 are located to couple the side member 12a and the side member 12b to each other. A movable member 24 is movably located on the pair of guide rails 22. The ejection head 14 is located on a front surface 24a of the movable member 24 so as to be movable along a guide rail (not shown) extending in the Z axis direction. A motor (not shown) provided on the movable member 24 is driven by the control of the microcomputer 50, so that the movable member 24 is movable leftward and rightward in the X axis direction along the guide rails 22. Because of such a structure, the ejection head 14 located on the movable member 24 is also movable in the X axis direction. A motor (not shown) provided on the ejection head 14 is driven by the control of the microcomputer 50, so that the ejection head 14 is movable upward and downward in the Z axis direction along the guide rail mentioned above.

The ejection head 14 is supplied with a photo-curable resin from a tank (not shown) provided in the rear member 12d via a tube 28. The photo-curable resin supplied via the tube 28 is ejected from a nozzle head 14b provided on a bottom surface 14a of the ejection head 14. A light irradiation head 14c is provided on the bottom surface 14a of the ejection head 14. The light irradiation head 14c irradiates the photo-curable resin ejected from the nozzle head 14b with light, so that the photo-curable resin is cured. Because of this, the photo-curable resin ejected from the nozzle head 14b of the ejection head 14 is irradiated with light from the light irradiation head 14c immediately after being ejected and thus is cured. With such a structure, the ejection head 14 ejects a photo-curable resin from the nozzle head 14b while moving in the X axis direction and the Z axis direction, and irradiates the ejected photo-curable resin with light by the light irradiation head 14c to cure the photo-curable resin, under the control of the microcomputer 50.

The table 16 is movably provided on a pair of guide rails 26 extending in the Y axis direction on the bottom member 12c of the housing 12. A motor (not shown) provided on the table 16 is driven by the control of the microcomputer 50, so that the table 16 is movable forward and rearward in the Y axis direction along the pair of guide rails 26.

Figure 2:
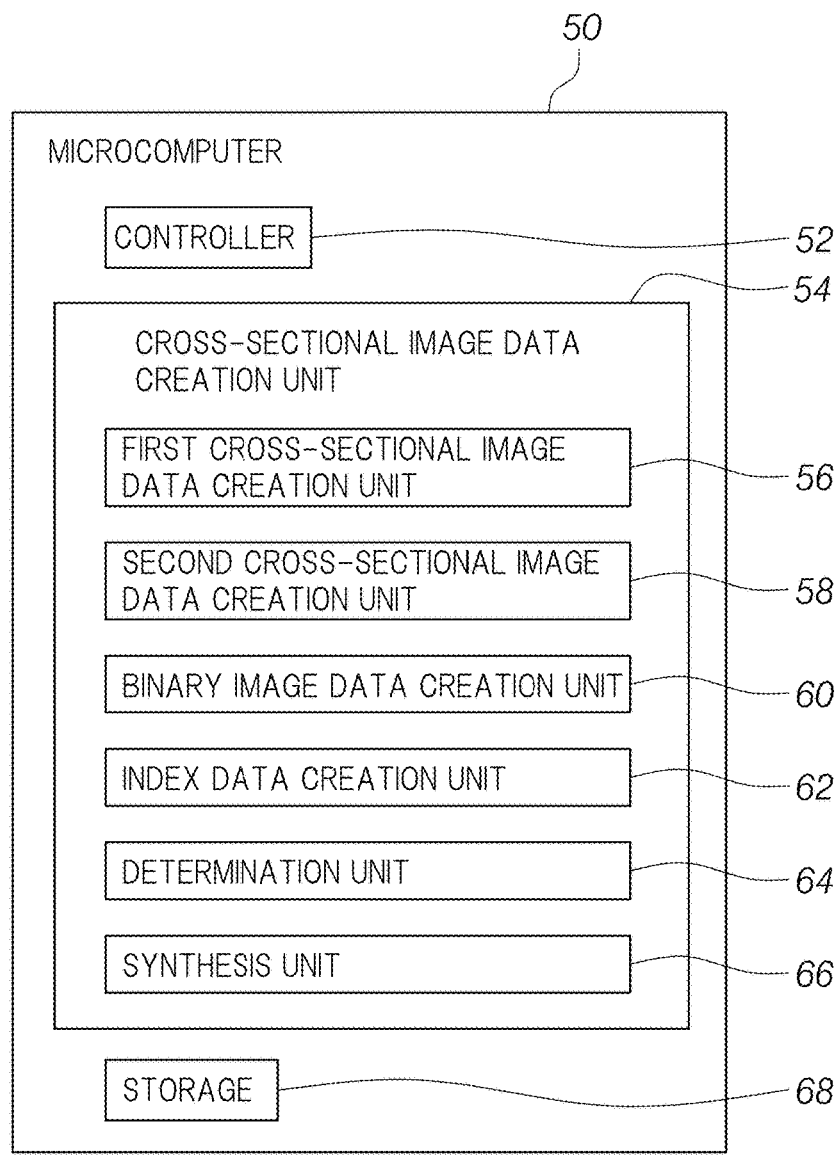
FIG. 2 is a block diagram showing a structure of a microcomputer.

Now, with reference to FIG. 2, a functional structure of the microcomputer 50 described above will be described. The microcomputer 50 is configured or programmed to include a controller 52, a cross-sectional image data generator 54, and a storage 68. The function of the cross-sectional image data generator 54 will be described later in detail. The controller 52 may be a CPU (central processing unit), for example. The storage 68 may be, for example, a memory or the like. The CPU is configured or programmed to execute a program (program on the creation of cross-sectional image data) stored on a RAM (random access memory; not shown) to functionally realize the cross-sectional image data generator 54 shown in FIG. 2.

The controller 52 is configured or programmed to control the overall operations of the three-dimensional printing apparatus 10 in this preferred embodiment. The controller 52 controls operations of the elements including, for example, the movement of the movable member 24 in the X axis direction, the movement of the ejection head 14 in the Z axis direction, and the movement of the table 16 in the Y axis direction, which are performed by driving the motors. The cross-sectional image data generator 54 creates cross-sectional image data that is required to create a three-dimensional printing object. The storage 68 stores the cross-sectional image data created by the cross-sectional image data generator 54.

Now, the cross-sectional image data generator 54 will be described in detail. The cross-sectional image data generator 54 includes a first cross-sectional image data generator 56, a second cross-sectional image data generator 58, a binary image data generator 60, an index data generator 62, a comparator 64, and a synthesizer 66. The first cross-sectional image data generator 56 creates cross-sectional image data of a target model (printing object model) TM by use of three-dimensional data of the target model TM representing only the shape of a three-dimensional printing object. The second cross-sectional image data generator 58 creates cross-sectional image data of a full model FM by use of three-dimensional data of the full model (three-dimensional printing object model) FM including a support model SM and the target model TM. The binary image data generator 60 binarizes the created cross-sectional image data. The index data generator 62 indexes the binarized cross-sectional image data. The comparator 64 determines whether or not index data of two pieces of cross-sectional image data (described later) are recognized to match each other by at least a predetermined ratio. The synthesizer 66 synthesizes the cross-sectional image data of the full model FM including the support model SM and the cross-sectional image data of the target model TM that does not include the support model SM. Hereinafter, the "target model TM" refers to a model that does not include the support model SM and represents only the shape of a three-dimensional printing object. The "support model SM" refers to a model representing members that assists the creation of the three-dimensional printing object corresponding to the target model TM (hereinafter, the assisting member may be referred to as a "support member"). The "full model FM" refers to a model including both of the target model TM and the support model SM.

The functions of the elements will be described in more detail. The first cross-sectional image data generator 56 creates first cross-sectional image data from three-dimensional data of the target model TM that represents the shape of a three-dimensional printing object, which is going to be created. The first cross-sectional image data is an aggregation of a plurality of pieces of cross-sectional image data respectively corresponding to cross-sectional shapes that are obtained by dissecting the target model TM along an X-Y plane at a predetermined interval in the Z axis direction. Namely, the first cross-sectional image data including a plurality of pieces of cross-sectional image data is created from the three-dimensional data of one target model TM. The pieces of cross-sectional image data included in the first cross-sectional image data are assigned layer numbers from the data having the minimum Z axis coordinate value in the cross-sectional shape as follows, for example. It is now assumed that the cross-sectional shapes are obtained at Z axis coordinate values of 0, Z1, Z2, Z3, . . . , Zn−1 (n is a positive integer; this is also applicable to the description hereinafter). The cross-sectional image data at the coordinate value of "0" is referred to as a first layer, the cross-sectional image data at the coordinate value of "Z1" is referred to as a second layer, the cross-sectional image data at the coordinate value of "Z2" is referred to as a third layer, and the cross-sectional image data at the coordinate value of "Z3" is referred to as a fourth layer. The cross-sectional image data at the coordinate value of "Zn−1" is referred to as an n'th layer (final layer).

The second cross-sectional image data generator 58 creates three-dimensional data of the full model FM including three-dimensional data corresponding to the support model SM (hereinafter, may be referred to as the "support model data") by a computing process, based on the three-dimensional data of the target model TM that represents the shape of the three-dimensional printing object, which is to be created. Namely, this three-dimensional data includes the three-dimensional data corresponding to the target model TM and the support model data corresponding to the support model SM.

The second cross-sectional image data generator 58 also creates second cross-sectional image data from the three-dimensional data of the full model FM including the support model data. The second cross-sectional image data is an aggregation of a plurality of pieces of cross-sectional image data respectively corresponding to cross-sectional shapes that are obtained by dissecting the full model FM along the X-Y plane at a predetermined interval in the Z axis direction. Namely, the second cross-sectional image data including a plurality of pieces of cross-sectional image data is created from the three-dimensional data of one full model FM.

The second cross-sectional image data generator 58 creates the second cross-sectional image data by use of the same Z axis coordinates as used for the first cross-sectional image data created by the first cross-sectional image data generator 56. Because of this, the number of the pieces of cross-sectional image data included in the first cross-sectional image data is equal to the number of the pieces of cross-sectional image data included in the second cross-sectional image data. The pieces of cross-sectional image data included in the first cross-sectional image data and the pieces of cross-sectional image data included in the second cross-sectional image data correspond to each other, respectively. Now, it is assumed that the cross-sectional shapes are obtained at Z axis coordinate values of 0, Z1, Z2, Z3, . . . , Zn−1 to form first cross-sectional image data including n pieces of cross-sectional image data. In this case, in order to generate second cross-sectional image data also, n pieces of cross-sectional image data are obtained at Z axis coordinate values of 0, Z1, Z2, Z3, . . . , Zn−1. Like in the case of the first cross-sectional image data, the pieces of cross-sectional image data included in the second cross-sectional image data are assigned layer numbers from the data having the minimum Z axis coordinate value in the cross-sectional shape. It is now assumed that the cross-sectional shapes are obtained at Z axis coordinate values of 0, Z1, Z2, Z3, . . . , Zn−1. The cross-sectional image data at the coordinate value of "0" is referred to as a first layer, the cross-sectional image data at the coordinate value of "Z1" is referred to as a second layer, the cross-sectional image data at the coordinate value of "Z2" is referred to as a third layer, and the cross-sectional image data at the coordinate value of "Z3" is referred to as a fourth layer. The cross-sectional image data at the coordinate value of "Zn−1" is referred to as an n'th layer (final layer).

Figure 3A:
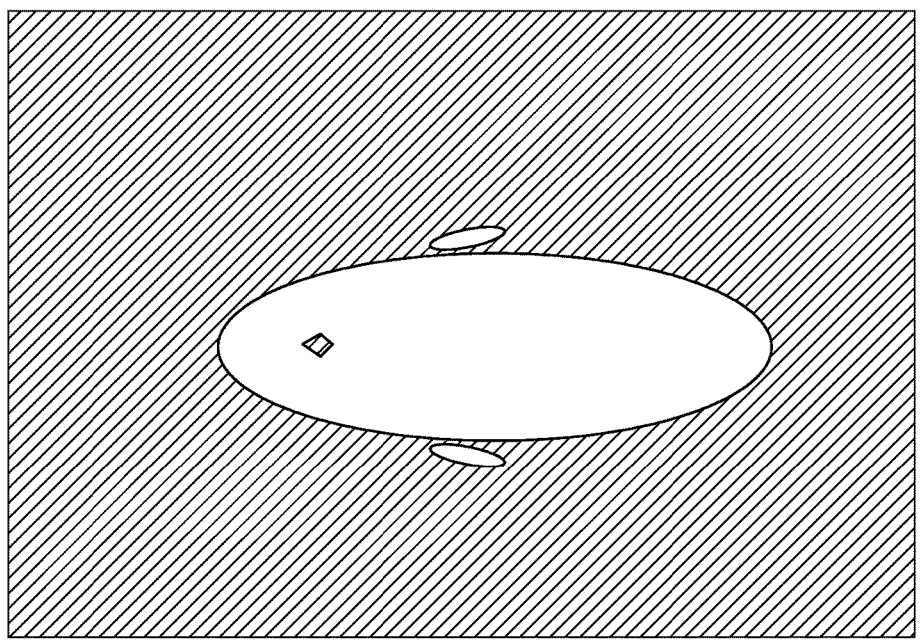
FIG. 3A shows an anti-aliased image represented by cross-sectional image data on a predetermined layer.
Figure 3B:
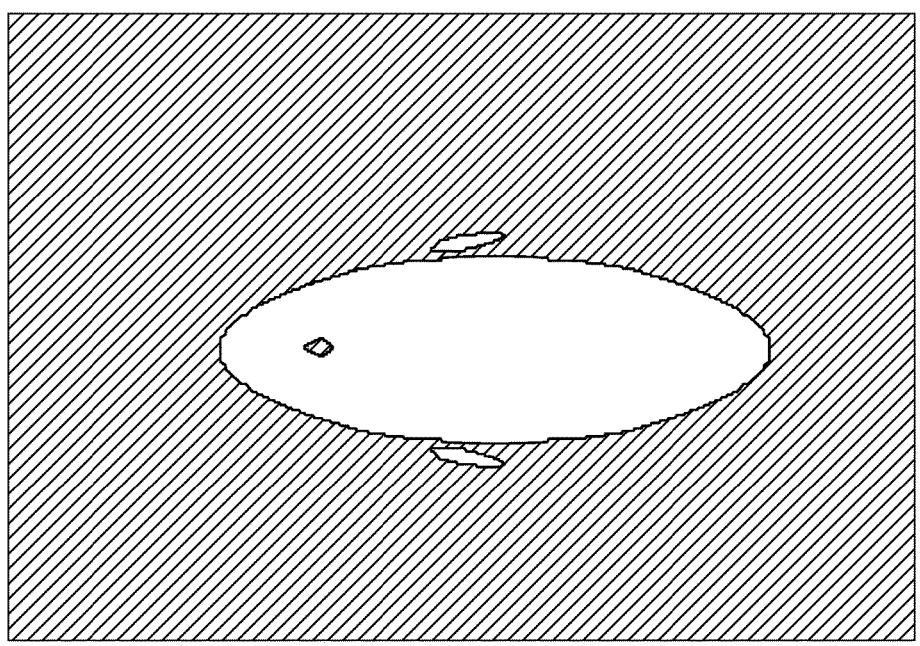
FIG. 3B shows an image represented by cross-sectional image data obtained by binarizing the cross-sectional image data shown in FIG. 3A.

The binary image data generator 60 binarizes the first cross-sectional image data created by the first cross-sectional image data generator 56 and the second cross-sectional image data created by the second cross-sectional image data generator 58. This will be described in more detail. As shown in FIG. 3A, the first cross-sectional image data created by the first cross-sectional image data generator 56 is anti-aliased. "Anti-aliasing" is to smoothly change the color at the contour of the target. As shown in FIG. 3B, the binary image data generator 60 converts the anti-aliased first cross-sectional image data into a binary image. Similarly, the second cross-sectional image data created by the second cross-sectional image data generator 58 is anti-aliased. The binary image data generator 60 converts the anti-aliased second cross-sectional image data into a binary image.

The index data generator 62 indexes the binarized first cross-sectional image data and the binarized second cross-sectional image data to create index data of the first cross-sectional image data and index data of the second cross-sectional image data. This will be described specifically. Index data is represented as follows. Among array elements in the following expression, element "0" represents a black portion of the image, whereas element "1" represents a white portion of the image.

simple_slice□={0, 0, 0, 0, 0, 1, 1, 1, 1, 1, 1, . . . }

The comparator 64 compares the index data of cross-sectional image data of a predetermined layer of the first cross-sectional image data against the index data of cross-sectional image data of the same layer of the second cross-sectional image data to determine whether or not the index data of the first cross-sectional image data and the index data of the second cross-sectional image data are recognized to match each other by at least a predetermined ratio. Specifically, the comparator 64 extracts white portions (portions represented by array elements "1") from the index data of the first cross-sectional image data, and extracts white portions from the index data of the second cross-sectional image data (index data of the same layer as that of the first cross-sectional image data). The comparator 64 determines whether or not the extracted white portions of the two pieces of data are recognized to match each other by, for example, at least about 80%.

Next, when the comparator 64 determines that the extracted white portions of the two pieces of data are recognized to match each other by at least the predetermined ratio, it is regarded that a cross-sectional image, which will be formed based on the cross-sectional image data on the predetermined layer of the second cross-sectional image data, will not have a missing portion. In this case, the cross-sectional image data on the predetermined layer of the second cross-sectional image data is stored in the storage 68 as cross-sectional image data of third cross-sectional image data. By contrast, when the comparator 64 determines that the extracted white portions of the two pieces of data are recognized not to match each other by at least the predetermined ratio, it is regarded that a cross-sectional image, which will be formed based on the cross-sectional image data on the predetermined layer of the second cross-sectional image data, will have a missing portion. In this case, the synthesizer 66 synthesizes the cross-sectional image data on the predetermined layer of the first cross-sectional image data and the cross-sectional image data on the predetermined layer of the second cross-sectional image data to create synthesis data. Namely, the synthesizer 66 synthesizes the cross-sectional image data that represents the full model FM including the support model SM and will have a missing portion, and thus the cross-sectional image data representing the target model TM. In this way, the cross-sectional image data of the full model FM including the support model SM and the target model TM is able to be created in a state where the cross-sectional image data of the corresponding target model TM is fully included. The synthesis data is stored in the storage 68 as cross-sectional image data of the third cross-sectional image data. The storage 68 stores the cross-sectional image data of the first layer through the n'th layer as the third cross-sectional image data.

Now, a method for creating a three-dimensional printing object by use of the three-dimensional printing apparatus 10 according to a preferred embodiment of the present invention will be described. First, an operator inputs, to the microcomputer 50, three-dimensional data of a three-dimensional model representing the shape of a three-dimensional printing object to be created. When an instruction is issued to create cross-sectional image data by an operation made by an operation element (not shown) or the like, the microcomputer 50 starts a process of creating cross-sectional image data. The process performed after this will be described with reference to FIG. 4A and FIG. 4B. An explanation of the flowchart in FIG. 4A and FIG. 4B overlap the above explanation on each of the elements of the microcomputer 50, and thus will be made briefly below.

Figure 4A:
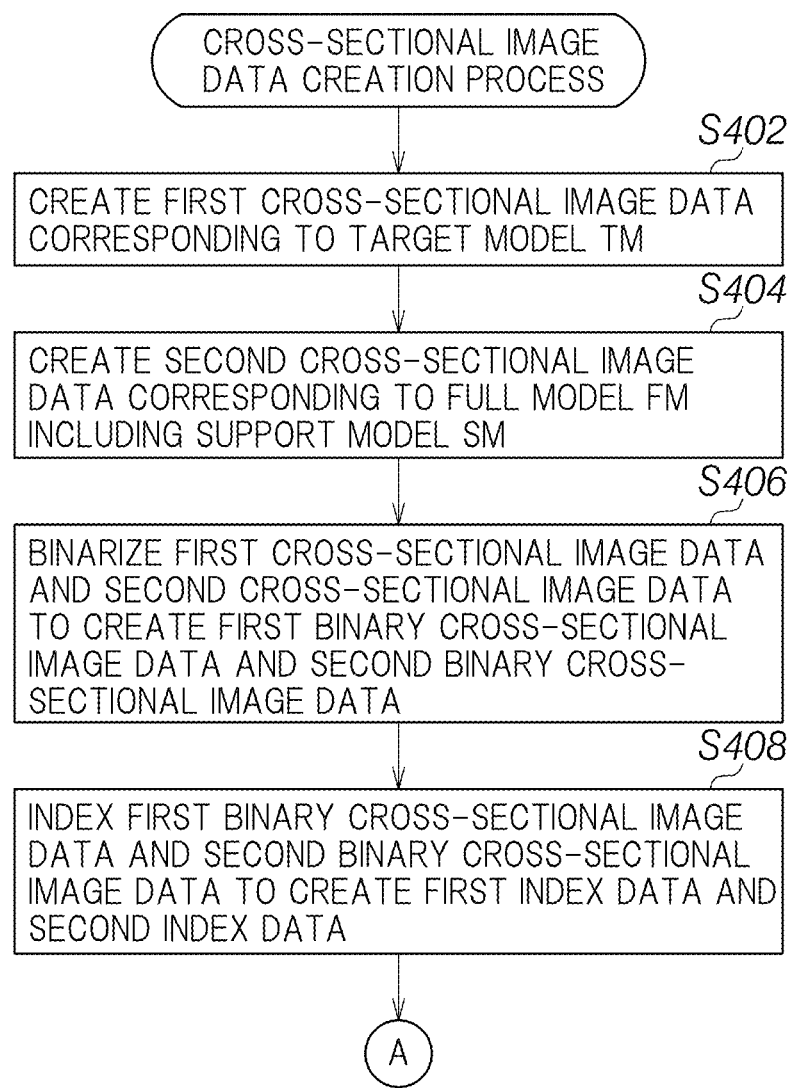
FIG. 4A and FIG. 4B are a flowchart showing a cross-sectional image data creation process.
Figure 4B:
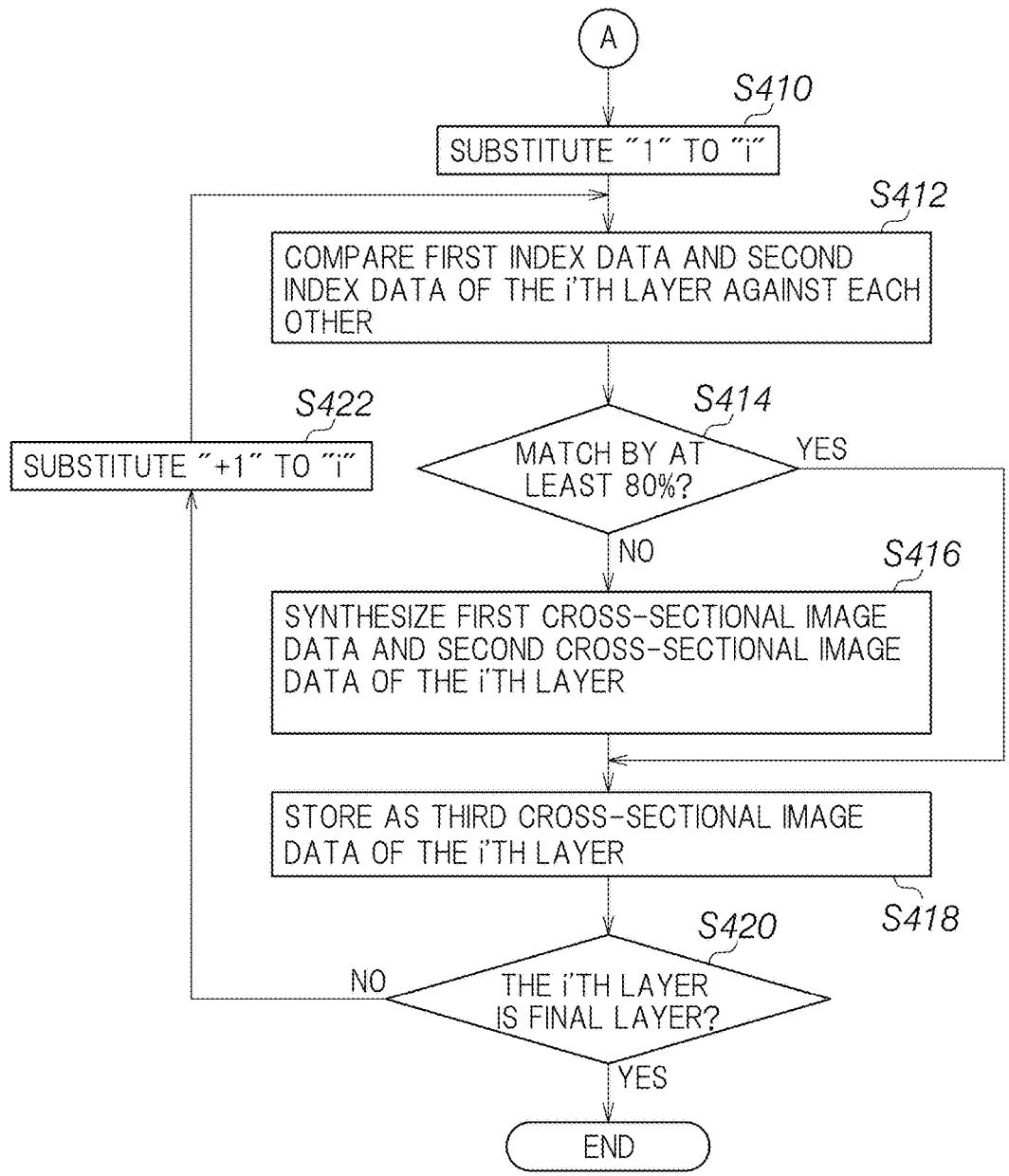

As shown in FIG. 4A, the first cross-sectional image data generator 56 creates first cross-sectional image data, which is an aggregation of a plurality of pieces of cross-sectional image data corresponding to the target model TM, based on the input three-dimensional data of the target model TM (step S402).

Figure 5A:
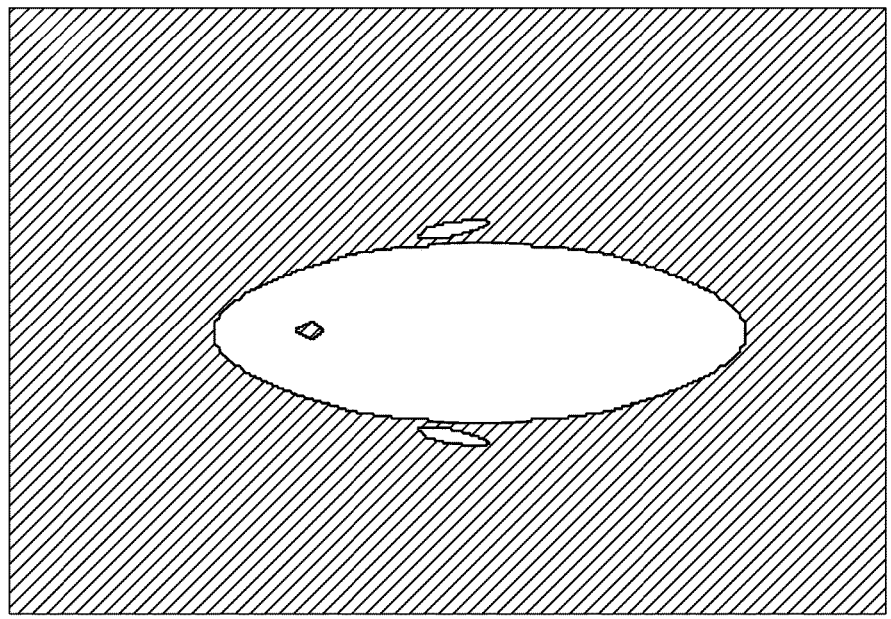
FIG. 5A shows a cross-sectional image represented by cross-sectional image data on a predetermined layer of first cross-sectional image data.
Figure 5B:
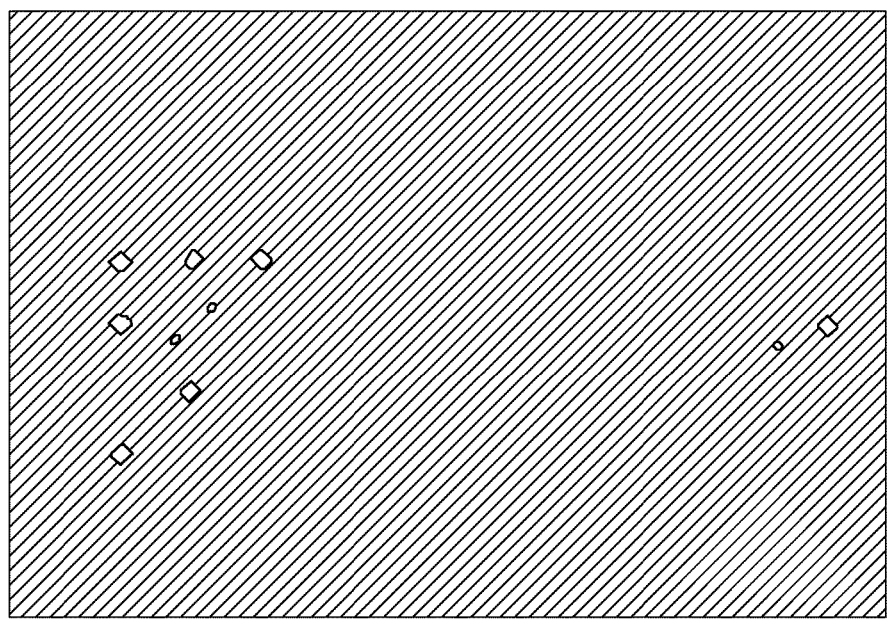
FIG. 5B is a cross-sectional image represented by cross-sectional image data on another predetermined layer of second cross-sectional image data.
Figure 6:
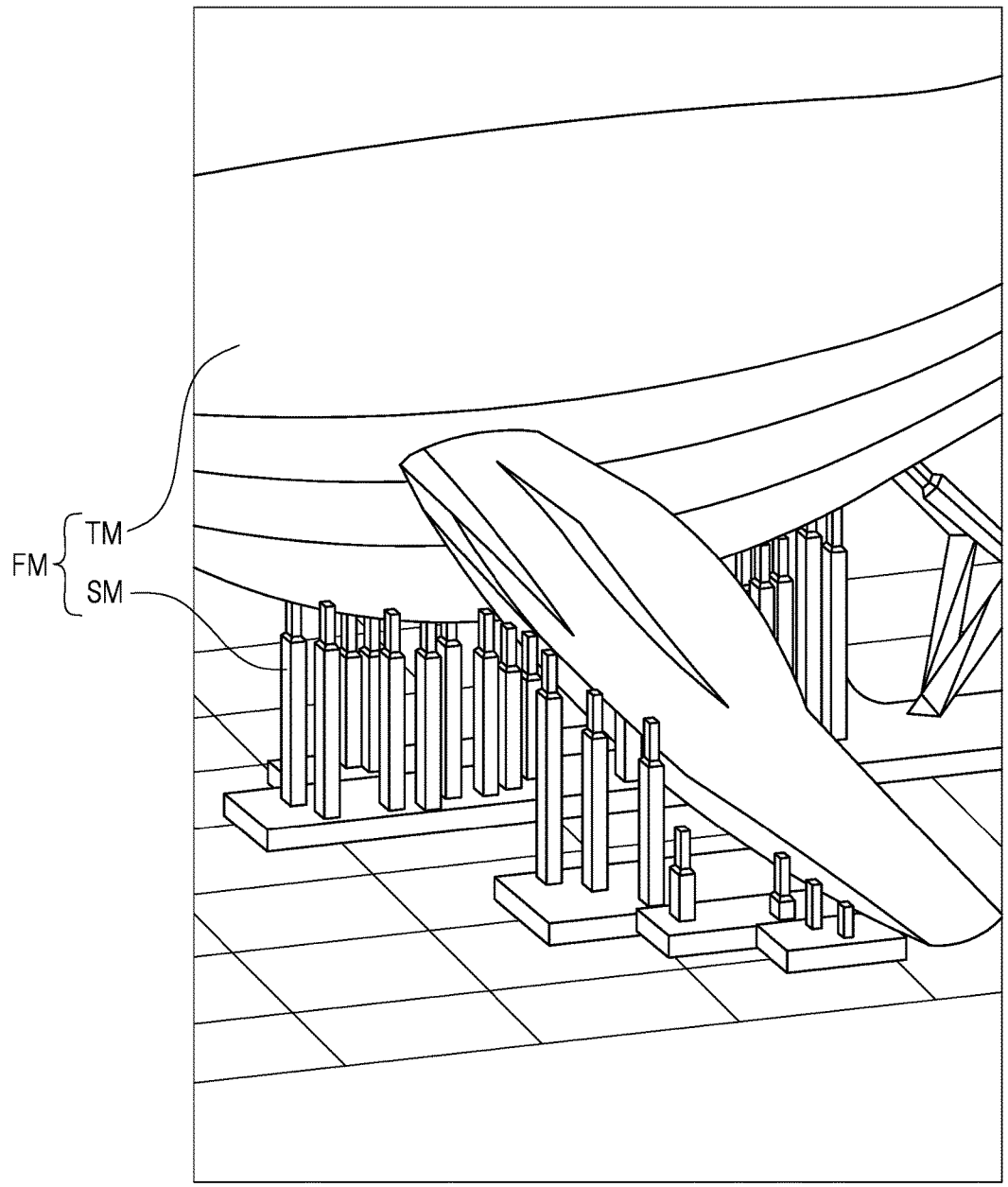
FIG. 6 shows a three-dimensional model including a support model.

Next, the second cross-sectional image data generator 58 creates second cross-sectional image data, which is an aggregation of a plurality of pieces of cross-sectional image data corresponding to the full model FM including the support model SM, based on the input three-dimensional data of the full model FM (step S404). FIG. 5A shows a cross-sectional image represented by the cross-sectional image data of a predetermined layer of the first cross-sectional image data, and FIG. 5B shows a cross-sectional image represented by the cross-sectional image data of another predetermined layer of the second cross-sectional image data.

Next, the binary image data generator 60 binarizes the first cross-sectional image data and the second cross-sectional image data to create first binary cross-sectional image data and second binary cross-sectional image data (step S406).

Then, the index data generator 62 indexes the first binary cross-sectional image data and the second binary cross-sectional image data to create first index data and the second index data (step S408).

Next, the comparator 64 substitutes 1 to "i", which represents the layer number of the cross-sectional image data (step S410). The comparator 64 compares the first index data and the second index data on the i'th layer against each other (step S412), and determines whether or not the first index data and the second index data are recognized to match each other by at least a predetermined ratio (step S414). Specifically, the comparator 64 extracts white portions of the first index data on the i'th layer and white portions of the second index data on the same layer, and compares the white portions against each other. When it is determined that the white portions are recognized to match each other by, for example, at least about 80% (Yes in step S414), the cross-sectional image data on the i'th layer of the second cross-sectional image data is stored in the storage 68 as cross-sectional image data of third cross-sectional image data (step S418). By contrast, when it is determined that the white portions are recognized not to match each other by, for example, at least about 80% (No in step S414), the synthesizer 66 synthesizes the cross-sectional image data on the i'th layer of the first cross-sectional image data and the cross-sectional image data of the i'th layer of the second cross-sectional image data (step S416). Specifically, the cross-sectional image data on the i'th layer of the first cross-sectional image data and the cross-sectional image data on the i'th layer of the second cross-sectional image data are synthesized such that a cross-sectional image represented by the cross-sectional image data on the i'th layer of the first cross-sectional image data is located at the position where a cross-sectional image represented by the cross-sectional image data on the i'th layer of the second cross-sectional image data is to be located. Then, the synthesis data is stored in the storage 68 as the cross-sectional image data of the third cross-sectional image data (step S418).

After the storage of the cross-sectional image data on the i'th layer is finished in this manner, the controller 52 determines whether the i'th layer is the final layer or not (step S420). When it is determined that the i'th layer is not the final layer (No in step S420), "+1" is substituted to "i" (step S422), and the above-described processes of step S412 and thereafter are repeated. In the process of step S412, the first index data on the next layer and the second index data on the same, next layer are compared against each other. By contrast, when it is determined that i'th layer is the final layer (Yes in step S420), the process is finished. In this manner, the third cross-sectional image data is created that includes a plurality of pieces of cross-sectional image data on the first layer through the n'th layer.

Then, when the operator makes an operation on an operation element (not shown) to issue an instruction to start creating a three-dimensional printing object, the table 16 is moved in the Y axis direction, the movable member 24 is moved in the X axis direction, and the ejection head 14 is ejects a photo-curable resin while moving in the Z axis direction, based on the third cross-sectional image data stored in the storage 68. Thus, the three-dimensional printing object is created on the top surface 16*a* of the table 16.

As described above, the three-dimensional printing apparatus 10 in this preferred embodiment operates as follows. First cross-sectional image data representing the shape of a target model TM and second cross-sectional image data representing a full model FM including a support model SM are created from three-dimensional data of the target model TM that represents the shape of a three-dimensional printing object. The first cross-sectional image data and the second cross-sectional image data are binarized to create first binary cross-sectional image data and second binary cross-sectional image data. The first binary cross-sectional image data and the second binary cross-sectional image data are indexed to create first index data and second index data. The first index data and the second index data on the same layer are compared against each other. When the first index data and the second index data are recognized to match each other by at least a predetermined ratio (e.g., 80%), the second cross-sectional image data is stored as third cross-sectional image data. When the first index data and the second index data are not recognized to match each other by at least the predetermined ratio, synthesis data of the first cross-sectional image data and the second cross-sectional image data is stored as third cross-sectional image data. In this manner, third cross-sectional image data that represents the cross-sectional shape of the fill model FM including the support model SM and has no flaw of causing a missing portion that can be easily created without requiring a long time.

Since the third cross-sectional image data that accurately represents the full model FM including the support model SM is created, creation of the three-dimensional printing object, which is a final printing object, does not fail. Thus, the three-dimensional printing object is created efficiently. This improves the productivity of the three-dimensional printing objects, and the production cost of the three-dimensional printing objects is reduced.

The above preferred embodiment may be modified as described in (1) through (6) below.

(1) In the above preferred embodiment, the movable member 24 preferably is movable in the X axis direction, the table 16 is movable in the Y axis direction, and the ejection head 14 is movable in the Z axis direction. The present invention is not limited to this. Any structure in which the positional relationship between the table 16 and the ejection head 14 is changeable three-dimensionally is usable. Any one of the movable member 24, the table 16 and the ejection head 14 may be fixed.

(2) In the above preferred embodiment, the third cross-sectional image data preferably is created by the microcomputer 50. The present invention is not limited to this. The third cross-sectional image data may be created by a personal computer prepared separately, and the third cross-sectional image data may be input to the microcomputer 50 before the creation of a three-dimensional printing object, thus to create the three-dimensional printing object.

(3) In the three-dimensional printing apparatus 10 in the above preferred embodiment, the positional relationship between the ejection head 14 and the table 16 preferably is changeable three-dimensionally, and a three-dimensional printing object is created, of a photo-curable resin ejected from the ejection head 14, on the top surface 16*a* of the table 16. The present invention is not limited to this. The present invention is applicable to a three-dimensional printing apparatus of a so-called suspension stacking system. According to the suspension stacking system, light is directed toward a predetermine image from a projector located on a bottom surface of a container that accommodates a liquid photo-curable resin, the photo-curable resin is cured by a predetermined thickness on a bottom surface of a holding plate located in the container to form a cured layer, and such cured layers are stacked to create a three-dimensional printing object. The present invention is applicable to any three-dimensional printing apparatus capable of creating a three-dimensional printing object based on cross-sectional image data that represents a three-dimensional model including a support model.

(4) In the above preferred embodiment, the first cross-sectional image data and the second cross-sectional image data preferably are compared as follows. The first cross-sectional image data and the second cross-sectional image data are binarized, the binarized pieces of cross-sectional image data are indexed, and the two pieces of index data are compared against each other. The present invention is not limited to this. For comparing the first cross-sectional image data and the second cross-sectional image data, a conventional technology capable of calculating the ratio by which the two pieces of cross-sectional image data match each other is usable.

(5) In the above preferred embodiment, white portions preferably are extracted from two pieces of index data, and it is preferably determined whether or not the white portions are recognized to match each other by at least about 80%, for example. The present invention is not limited to this. The predetermined ratio may be, for example, about 75%, about 85% or the like, and may be set optionally. The predetermined ratio is set to a value by which when a white portion of the index data of the first cross-sectional image data and a white portion of the index data of the second cross-sectional image data are compared against each other, it can be determined whether or not a cross-section of a three-dimensional model represented by the second cross-sectional image data will have a missing portion.

(6) The above preferred embodiment and the modifications described in (1) through (5) may be optionally combined.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as describing non-limiting preferred embodiments of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus that creates a three-dimensional printing object based on three-dimensional data representing a shape of the three-dimensional printing object, the three-dimensional printing apparatus comprising:
    a processor; and
    a storage; wherein
    the processor is configured or programmed to create first cross-sectional image data representing a target model corresponding to the shape of the three-dimensional printing object, from a plurality of cross-sectional shapes that are continuous in a predetermined direction, by use of the three-dimensional data;
    the processor is configured or programmed to create second cross-sectional image data representing both of the target model and a support model defining a physical structure that includes a shape of a member assisting the creation of the three-dimensional printing object, from a plurality of cross-sectional shapes that are continuous in the predetermined direction, by use of the three-dimensional data;
    the processor is configured or programmed to binarize the first cross-sectional image data and the second cross-sectional image data to create first binary cross-sectional image data and second binary cross-sectional image data;
    the processor is configured or programmed to index the first binary cross-sectional image data and the second binary cross-sectional image data to create first index data and second index data, each of which includes array elements each having a value of "0" or "1";
    the processor is configured or programmed to compare the first index data and the second index data against each other to determine whether or not the first index data and the second index data are recognized to match each other by at least a predetermined ratio;
    the processor is configured or programmed to synthesize the first cross-sectional image data and the second cross-sectional image data to create synthesis data such that a cross-sectional image represented by the cross-sectional image data on an i'th layer of the first cross-sectional image data is located at the position where a cross-sectional image represented by the cross-sectional image data on the i'th layer of the second cross-sectional image data is to be located;
    the storage stores the second cross-sectional image data or the synthesis data as third cross-sectional image data;
    when the processor determines that the first index data and the second index data are recognized to match each other by at least the predetermined ratio, the second cross-sectional image data is stored in the storage as the third cross-sectional image data;
    when the processor determines that the first index data and the second index data are recognized not to match each other by at least the predetermined ratio, the synthesis data is stored in the storage as the third cross-sectional image data; and
    the three-dimensional printing object is created based on the third cross-sectional image data.

2. A three-dimensional printing apparatus according to claim 1, wherein the processor is configured or programmed to compare array element value "1" of the first index data and array element value "1" of the second index data to determine whether or not the first index data and the second index data are recognized to match each other by at least the predetermined ratio.

3. A method for three-dimensional printing that creates a three-dimensional printing object based on three-dimensional data representing a shape of the three-dimensional printing object, the method comprising:
    a first step of creating first cross-sectional image data representing a target model corresponding to the shape of the three-dimensional printing object, from a plurality of cross-sectional shapes that are continuous in a predetermined direction, by use of the three-dimensional data;
    a second step of creating second cross-sectional image data representing both of the target model and a support model defining a physical structure that includes a shape of members assisting the creation of the three-dimensional printing object, from a plurality of cross-sectional shapes that are continuous in the predetermined direction, by use of the three-dimensional data;
    a third step of comparing the first cross-sectional image data and the second cross-sectional image data against each other to determine whether or not the first cross-sectional image data and the second cross-sectional image data are recognized to match each other by at least a predetermined ratio;
    a fourth step of storing the second cross-sectional image data in storage as third cross-sectional image data when it is determined in the third step that the first cross-sectional image data and the second cross-sectional image data are recognized to match each other by at least the predetermined ratio, whereas storing synthesis data obtained by synthesizing the first cross-sectional image data and the second cross-sectional image data, such that a cross-sectional image represented by the cross-sectional image data on an i'th layer of the first cross-sectional image data is located at the position where a cross-sectional image represented by the cross-sectional image data on the i'th layer of the second cross-sectional image data is to be located, in the storage as the third cross-sectional image data when it is determined in the third step that the first cross-sectional image data and the second cross-sectional image data are recognized not to match each other by at least the predetermined ratio;

a fifth step of creating the three-dimensional printing object based on the third cross-sectional image data;

a sixth step of binarizing the first cross-sectional image data and the second cross-sectional image data to create first binary cross-sectional image data and second binary cross-sectional image data; and a seventh step of indexing the first binary cross-sectional image data and the second binary cross-sectional image data to create first index data and second index data each of which includes array elements each having a value of "0" or "1"; wherein the third step includes the step of comparing the first index data and the second index data against each other to determine whether or not the first index data and the second index data are recognized to match each other by at least a predetermined ratio; and the fourth step includes the step of storing the second cross-sectional image data in the storage as the third cross-sectional image data when it is determined that the first index data and the second index data are recognized to match each other by at least the predetermined ratio, whereas storing the synthesis data in the storage as the third cross-sectional image data when it is determined that the first index data and the second index data are recognized not to match each other by at least the predetermined ratio.

4. A method for three-dimensional printing according to claim 3, wherein the third step includes the step of comparing array element value "1" of the first index data and array element value "1" of the second index data to determine whether or not the first index data and the second index data are recognized to match each other by at least the predetermined ratio.

5. A non-transitory computer-readable storage medium on which a program that causes a computer to execute a method for three-dimensional printing, the method comprising:

a first step of creating first cross-sectional image data representing a target model corresponding to a shape of a three-dimensional printing object, from a plurality of cross-sectional shapes that are continuous in a predetermined direction, by use of three-dimensional data;

a second step of creating second cross-sectional image data representing both of the target model and a support model defining a physical structure that includes a shape of members assisting the creation of the three-dimensional printing object, from a plurality of cross-sectional shapes that are continuous in the predetermined direction, by use of the three-dimensional data;

a third step of comparing the first cross-sectional image data and the second cross-sectional image data against each other to determine whether or not the first cross-sectional image data and the second cross-sectional image data are recognized to match each other by at least a predetermined ratio;

a fourth step of storing the second cross-sectional image data in storage as third cross-sectional image data when it is determined in the third step that the first cross-sectional image data and the second cross-sectional image data are recognized to match each other by at least the predetermined ratio, whereas storing synthesis data obtained by synthesizing the first cross-sectional image data and the second cross-sectional image data, such that a cross-sectional image represented by the cross-sectional image data on an i'th layer of the first cross-sectional image data is located at the position where a cross-sectional image represented by the cross-sectional image data on the i'th layer of the second cross-sectional image data is to be located, in the storage as the third cross-sectional image data when it is determined in the third step that the first cross-sectional image data and the second cross-sectional image data are recognized not to match each other by at least the predetermined ratio;

a fifth step of creating the three-dimensional printing object based on the third cross-sectional image data;

a sixth step of binarizing the first cross-sectional image data and the second cross-sectional image data to create first binary cross-sectional image data and second binary cross-sectional image data; and a seventh step of indexing the first binary cross-sectional image data and the second binary cross-sectional image data to create first index data and second index data each of which includes array elements each having a value of "0" or "1"; wherein the third step includes the step of comparing the first index data and the second index data against each other to determine whether or not the first index data and the second index data are recognized to match each other by at least a predetermined ratio; and the fourth step includes the step of storing the second cross-sectional image data in the storage as the third cross-sectional image data when it is determined that the first index data and the second index data are recognized to match each other by at least the predetermined ratio, whereas storing the synthesis data in the storage as the third cross-sectional image data when it is determined that the first index data and the second index data are recognized not to match each other by at least the predetermined ratio.

6. A three-dimensional printing apparatus according to claim 1, wherein the processor is configured or programmed to anti-alias the first cross-sectional image data and the second cross-sectional image data.

7. A method for three-dimensional printing according to claim 3, further comprising a step of anti-aliasing the first cross-sectional image data and the second cross-sectional image data.

8. A non-transitory computer-readable storage medium on which a program that causes a computer to execute a method for three-dimensional printing according to claim 5, the method further comprising a step of anti-aliasing the first cross-sectional image data and the second cross-sectional image data.

9. A three-dimensional printing apparatus that creates a three-dimensional printing object based on three-dimensional data representing a shape of the three-dimensional printing object, the three-dimensional printing apparatus comprising:

a processor; and a storage; wherein the processor is configured or programmed to create first cross-sectional image data representing a target model corresponding to the shape of the three-dimensional printing object, from a plurality of cross-sectional shapes that are continuous in a predetermined direction, by use of the three-dimensional data;

the processor is configured or programmed to create second cross-sectional image data representing both of the target model and a support model defining a physical structure that includes a shape of a member assisting the creation of the three-dimensional printing object, from a plurality of cross-sectional shapes that are continuous in the predetermined direction, by use of the three-dimensional data;

the processor is configured or programmed to compare white portions of the first cross-sectional image data and the second cross-sectional image data against each other to determine whether or not the first cross-sectional image data and the second cross-sectional image data are recognized to match each other by at least a predetermined ratio;

the processor is configured or programmed to synthesize the first cross-sectional image data and the second cross-sectional image data to create synthesis data such that a cross-sectional image represented by the cross-sectional image data on an i'th layer of the first cross-sectional image data is located at the position where a cross-sectional image represented by the cross-sectional image data on the i'th layer of the second cross-sectional image data is to be located;

the storage stores the second cross-sectional image data or the synthesis data as third cross-sectional image data;

when the processor determines that the first cross-sectional image data and the second cross-sectional image data are recognized to match each other by at least the predetermined ratio, the second cross-sectional image data is stored in the storage as the third cross-sectional image data;

when the processor determines that the first cross-sectional image data and the second cross-sectional image data are recognized not to match each other by at least the predetermined ratio, the synthesis data is stored in the storage as the third cross-sectional image data; and the three-dimensional printing object is created based on the third cross-sectional image data.

10. A method for three-dimensional printing that creates a three-dimensional printing object based on three-dimensional data representing a shape of the three-dimensional printing object, the method comprising:

a first step of creating first cross-sectional image data representing a target model corresponding to the shape of the three-dimensional printing object, from a plurality of cross-sectional shapes that are continuous in a predetermined direction, by use of the three-dimensional data;

a second step of creating second cross-sectional image data representing both of the target model and a support model defining a physical structure that includes a shape of members assisting the creation of the three-dimensional printing object, from a plurality of cross-sectional shapes that are continuous in the predetermined direction, by use of the three-dimensional data;

a third step of comparing white portions of the first cross-sectional image data and the second cross-sectional image data against each other to determine whether or not the first cross-sectional image data and the second cross-sectional image data are recognized to match each other by at least a predetermined ratio;

a fourth step of storing the second cross-sectional image data in storage as third cross-sectional image data when it is determined in the third step that the first cross-sectional image data and the second cross-sectional image data are recognized to match each other by at least the predetermined ratio, whereas storing synthesis data obtained by synthesizing the first cross-sectional image data and the second cross-sectional image data, such that a cross-sectional image represented by the cross-sectional image data on an i'th layer of the first cross-sectional image data is located at the position where a cross-sectional image represented by the cross-sectional image data on the i'th layer of the second cross-sectional image data is to be located, in the storage as the third cross-sectional image data when it is determined in the third step that the first cross-sectional image data and the second cross-sectional image data are recognized not to match each other by at least the predetermined ratio; and a fifth step of creating the three-dimensional printing object based on the third cross-sectional image data.

11. A non-transitory computer-readable storage medium including stored thereon a program that causes a computer to execute a method for three-dimensional printing, the method comprising:

a first step of creating first cross-sectional image data representing a target model corresponding to a shape of a three-dimensional printing object, from a plurality of cross-sectional shapes that are continuous in a predetermined direction, by use of three-dimensional data;

a second step of creating second cross-sectional image data representing both of the target model and a support model defining a physical structure that includes a shape of members assisting the creation of the three-dimensional printing object, from a plurality of cross-sectional shapes that are continuous in the predetermined direction, by use of the three-dimensional data;

a third step of comparing white portions of the first cross-sectional image data and the second cross-sectional image data against each other to determine whether or not the first cross-sectional image data and the second cross-sectional image data are recognized to match each other by at least a predetermined ratio;

a fourth step of storing the second cross-sectional image data in storage as third cross-sectional image data when it is determined in the third step that the first cross-sectional image data and the second cross-sectional image data are recognized to match each other by at least the predetermined ratio, whereas storing synthesis data obtained by synthesizing the first cross-sectional image data and the second cross-sectional image data, such that a cross-sectional image represented by the cross-sectional image data on an i'th layer of the first cross-sectional image data is located at the position where a cross-sectional image represented by the cross-sectional image data on the i'th layer of the second cross-sectional image data is to be located, in the storage as the third cross-sectional image data when it is determined in the third step that the first cross-sectional image data and the second cross-sectional image data are recognized not to match each other by at least the predetermined ratio; and a fifth step of creating the three-dimensional printing object based on the third cross-sectional image data.

* * * * *